`US007215750B2`

United States Patent
Nguyen et al.

(10) Patent No.: US 7,215,750 B2
(45) Date of Patent: May 8, 2007

(54) SYSTEM AND METHOD FOR PROVIDING CUSTOM CALLER-ID MESSAGES

(75) Inventors: Hong Thi Nguyen, Atlanta, GA (US); Edward Michael Silver, Atlanta, GA (US); Vernon Meadows, Lilburn, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 10/322,928

(22) Filed: Dec. 18, 2002

(65) Prior Publication Data
US 2004/0120477 A1 Jun. 24, 2004

(51) Int. Cl.
*H04M 1/56* (2006.01)
*H04M 15/00* (2006.01)
*H04M 15/06* (2006.01)

(52) U.S. Cl. .................. 379/142.06; 379/114.03; 379/114.05; 379/114.29; 379/142.09; 379/142.15

(58) Field of Classification Search .......... 379/88.13, 379/88.21, 48, 142.7; 455/455, 415
See application file for complete search history.

(56) References Cited

U.S. PATENT DOCUMENTS

| | | | | |
|---|---|---|---|---|
| 5,784,444 A * | 7/1998 | Snyder et al. | ......... | 379/142.01 |
| 5,864,612 A * | 1/1999 | Strauss et al. | ......... | 379/142.03 |
| 6,192,116 B1 * | 2/2001 | Mayak | ......... | 379/142.08 |
| 6,310,944 B1 * | 10/2001 | Brisebois et al. | ...... | 379/142.01 |
| 6,411,692 B1 * | 6/2002 | Scherer | ......... | 379/127.01 |
| 6,618,474 B1 * | 9/2003 | Reese | ......... | 379/142.17 |
| 6,728,340 B2 * | 4/2004 | Vinson | ......... | 379/48 |
| 6,771,755 B1 * | 8/2004 | Simpson | ......... | 379/142.04 |
| 6,775,363 B2 * | 8/2004 | Conn et al. | ......... | 379/114.1 |
| 6,952,469 B2 * | 10/2005 | Han | ......... | 379/142.17 |
| 7,120,235 B2 * | 10/2006 | Altberg et al. | ......... | 379/114.13 |
| 2002/0067816 A1 * | 6/2002 | Bushnell | ......... | 379/201.02 |
| 2002/0076022 A1 * | 6/2002 | Bedingfield | ......... | 379/142.01 |
| 2003/0092432 A1 * | 5/2003 | Hwang | ......... | 455/415 |
| 2003/0128821 A1 * | 7/2003 | Luneau et al. | ......... | 379/88.21 |

* cited by examiner

*Primary Examiner*—Fan Tsang
*Assistant Examiner*—Lisa Hashem
(74) *Attorney, Agent, or Firm*—Merchant & Gould

(57) ABSTRACT

Systems and methods for providing a message in Caller-ID information are described. In one embodiment of the present invention, an applications server, such as service control point (SCP), substitutes a message for Caller-ID information when a switch serving the called party's line requests the Caller-ID information. An embodiment may also include an application that provides a user interface, for example, a web-enabled interface, to allow the subscriber to add or change the message.

19 Claims, 3 Drawing Sheets

SYSTEM AND METHOD FOR PROVIDING CUSTOM CALLER-ID MESSAGES

NOTICE OF COPYRIGHT PROTECTION

A portion of the disclosure of this patent document and its figures contain material subject to copyright protection. The copyright owner has no objection to the facsimile reproduction by anyone of the patent document, but otherwise reserves all copyrights whatsoever.

FIELD OF THE INVENTION

The present invention generally relates to the provision of telecommunications services. The present invention more particularly relates to advanced messaging services.

BACKGROUND

Individuals and organizations alike are constantly striving to discover new ways to communicate. Recently instant messaging, short messaging services, and handheld, always-on email devices have become extremely popular with individuals. Organizations have responded by modifying their advertising strategy, making use of targeted e-mail campaigns, SMS marketing, and various other services directed at these new devices.

However, consumers are not always accepting of receiving e-mail or SMS-based advertisements. Also, organizations are sensitive to consumer's perceptions, particularly negative perceptions derived from receiving spam e-mail and SMS messages. Therefore, organizations continue to search for new communication channels, for advertising and for other purposes, such as consumer education.

SUMMARY

The present invention provides systems and methods for providing a message to a terminating point of a call. One embodiment of the present invention includes a communications network, a calling number identification (ID) database in communication with the network, and a user interface in communication with the telecommunications network. The Caller-ID database may include a message data store. The database includes storage for a message. In one embodiment, the attribute comprises a fifteen-character attribute.

In one embodiment of the present invention, customer premises equipment provides a Caller-ID display device for displaying the message. The Caller-ID device may comprise a telephone or a separate device.

A user interface in one embodiment of the present invention provides the subscriber with a means of creating, modifying or deleting the message to be displayed on the Caller-ID device. In one embodiment, the user interface is a web-enabled interface. In such an embodiment, a web server in communication with the telecommunications network executes the web-enabled interface, retrieving data from the database, accepting input from the user, and applying user input to the database data.

In an embodiment of the present invention, a subscriber places a call. The switch or other telecommunications component serving the called parties line requests Caller-ID information related to the calling party's telephone number from an applications server. The applications server responds with a message, such as an advertisement, instead of, or in addition to, the Caller-ID information. One embodiment of the present invention includes a means of displaying the message.

One embodiment of the present invention includes a means to associate a message with a telephone number. Associating the message with the telephone number may comprise entering the message into a user interface. The user interface may comprise a web-enabled or telephone-enabled user interface.

Embodiments of the present invention provide numerous advantages over conventional systems and methods. An embodiment of the present invention provides a new medium for providing information. In the case of an advertiser, an embodiment provides a new advertising channel.

An embodiment of the present invention also provides a flexible means for providing a message. The subscriber has the ability to change the content and type of message associated with their telephone number at any time. As multimedia phones and the underlying telecommunications network technologies are enhanced, the support for different media types will increase.

Further, an embodiment of the present invention operates within existing telecommunications infrastructures with minimal change. For example, in one embodiment, a user interface provides a mechanism for a subscriber to update the calling name attribute of the Caller-ID information presently stored in the Caller-ID database, requiring the service provider to support only the user interface and the associated code for updating the database. In other embodiments, the service provider may provide varying levels of complexity, including support for multimedia messages.

Further details and advantages of the present invention are set forth below.

BRIEF DESCRIPTION OF THE FIGURES

These and other features, aspects, and advantages of the present invention are better understood when the following Detailed Description is read with reference to the accompanying drawings, wherein.

DETAILED DESCRIPTION

Embodiments of the present invention provide systems and methods for providing a message to a recipient of a call. In an embodiment of the present invention, an applications server within a telecommunications network provides a message to a called party instead of, or in addition to, calling number identification (ID) information. The telecommunications service provider provides a subscriber with a means for supplying the message to be used.

Figure 1:
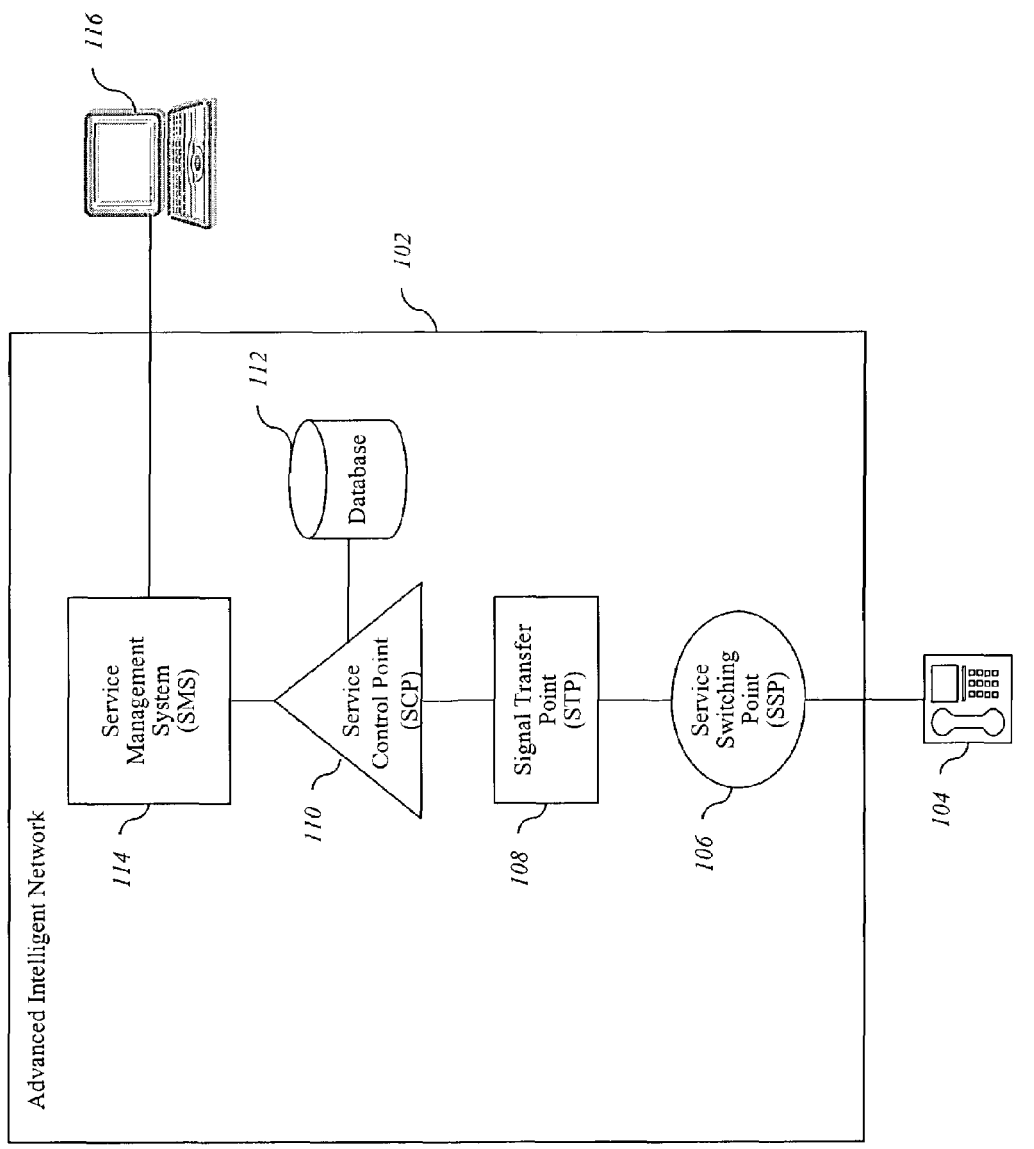
FIG. 1 (AIN) illustrates an exemplary environment for implementation of one embodiment of the present invention.

Referring now to the figures, in which like numerals indicate like elements throughout the several figures, FIG. 1 is a block diagram of an advanced intelligent network (AIN) 102 in one embodiment of the present invention. An embodiment of the present invention is advantageously embodied as a service in AIN 102. For the sake of brevity, only a basic description of the AIN is provided herein. For further information regarding aspects of the AIN, refer to Nguyen, U.S. Pat. No. 5,815,561, which is incorporated herein by reference.

AIN 102 represents a voice telecommunications network. AIN 102 comprises a plurality of telecommunications equipment and illustrates the telecommunications components typically owned or administered by a local exchange carrier. These components communicate out-of-band over signaling system 7 (SS7) links. SS7 is a standard protocol for setting up calls and providing communication features within the AIN 102.

A local exchange carrier locates AIN components in various physical locations to ensure the most efficient utilization of each component. For example, AIN 102 comprises a plurality of central offices (not shown). A central office comprises AIN components, including voice switches for providing voice-line communications services. Voice-line communication comprises both voice and data services, such as dial-up Internet access. A customer uses a phone 104 to communicate with a voice switch, illustrated by service switching point (SSP) 106. An SSP 106 provides intelligent call handling and routing. "SSP" and "switch" are used interchangeably herein to refer to an intelligent voice telecommunications switch.

Switches are interconnected through a series of communication links called trunks. Switches utilize trunks to establish communication links between terminals, such as telephones, faxes, and modems. Referring to FIG. 1, SSP 106 provides switching and additional intelligent network functionality by working in conjunction with various other components of an AIN 102. For example, SSP 106 communicates with a local signal transfer point (STP) 108. An STP, such as STP 108 in FIG. 1, is a packet switch that routes communication requests between the various elements in AIN 102, including SSP 106 and service control points, such as SCP 110 in FIG. 1.

For example, SSP 106 sends a query message in response to a trigger to STP 108. Although FIG. 1 includes a single SCP 110 for illustration purposes, AIN 102 comprises a plurality of additional SCPs as well (not shown). STP 108 queries its database (not shown) to determine to which SCP the query message from SSP 106 is to be directed.

An embodiment of the present invention utilizes an AIN software release 0.1 or higher. For more information see, see BellCore Specification TR-NWT-001284 Switching Systems Generic Requirements for AIN 0.1, which is incorporated herein by reference. AIN software supports a call model comprising points in call (PIC), trigger detection points (TDP), and triggers. SSP 106 checks at each TDP to see if there are any active triggers. If SSP 106 detects an active trigger, call processing is paused until the SSP 106 and SCP 110 complete a transaction. AIN release 0.1 and higher includes a formal call model, which comprises both originating and terminating call models.

SCP 110 provides program logic, translation, and routing data required to deliver advanced network features, such as Caller-ID, calling card, 800, and other services. To support such advanced features, SCP 110 accesses a database 112. SCP 110 may incorporate a database 112, or may access a database on a separate computer (not shown). To ensure continuity of service, an SCP 110 generally comprises redundant fault-tolerant computers. Also, AIN 102 preferably incorporates SCPs in tandem to further insure continuity of service.

SSP 106 and SCP 110 communicate via transactional capabilities application part (TCAP) messages over signaling system 7 (SS7) links. TCAP comprises the top layer of the SS7 protocol and supports transactional, non-circuit related, exchange between AIN 102 components.

A terminal initiates a communication. In the embodiment shown in FIG. 1, terminals are represented by telephone 104. However, numerous devices may operate as terminals in an embodiment of the present invention.

Terminals initiate communications at switches. The terminals communicate with the switches via analog or digital communication channels. When SSP 106 receives a communication from telephone 104, a trigger occurs. A trigger is an event in the AIN 102 that causes the SSP 106 to send a message to the SCP 110, requesting instructions for how to handle a communication. In response, the SCP 110 provides instructions to the SSP 106. The instructions may include a directive to play an announcement, route the call, collect digits, or perform other tasks necessary to provide an advanced service.

When an SSP 106 identifies a trigger and pauses to send a message, the SSP 106 opens a transaction, which causes an allocation of the memory of SSP 106. Also, when the SCP 110 receives a message from the SSP 106, the SCP 110 opens a transaction, causing an allocation of memory on the SCP 110. The memory allocated on the SSP 106 and SCP 110 remains allocated until the bi-directional communication between the two components ends and the transaction is closed.

AIN 102 may comprise additional components as well. For example, AIN 102 includes a service management system (SMS) 114. SMS 114 allows the creation and maintenance of information relating to subscribers and services in near real-time for both billing and administration of AIN 102. SMS 114 downloads information to the databases 112 of SCP 110 when subscribers add or modify AIN services. Also, SMS 114 downloads billing information necessary to bill subscribers for AIN services.

The embodiment shown in FIG. 1 also comprises a computer 116 in communication with SMS 114. The computer 116 provides a means for a subscriber to access applications on the SMS 114 in order to change attributes of the subscriber's services.

The AIN 102 sends Caller-ID information to the telephone 104 between the first and second rings of a call, using tones to represent ones and zeroes, in a manner similar to that used by modems. The message comprises a series of control signals followed by the caller information and a checksum byte. The caller information is provided in a Multiple Data Message Format (MDMF) that includes a byte indicating the type of message, a byte indicating the length of the message, the date and time, the calling number and the name.

Although FIG. 1 illustrates an AIN, other embodiments of the present invention may utilize Internet protocol networks instead of, or in conjunction with, the components present in AIN 102. For example, in one embodiment, a media gateway provides switching capabilities, and an applications server executes the application for providing a service according to the present invention.

In the embodiment shown in FIG. 1, the phone 104 includes a calling number identification (ID) display. When a subscriber receives a call, the phone 104 displays the number from which the call originates. If the subscriber has requested an advanced Caller-ID service, the phone may also, or instead, display the name of the calling party. In other embodiments, the Caller-ID display is provided by a separate piece of customer premises equipment (CPE). Bellcordia specification GR1299 § 6.58 provides the specification for Caller-ID and provides the capability of fifteen lines of text display of Caller-ID information. However, conventional Caller-ID displays, both on phones and on separate Caller-ID boxes, are typically limited to a maximum of three lines and often display only two.

Figure 2:
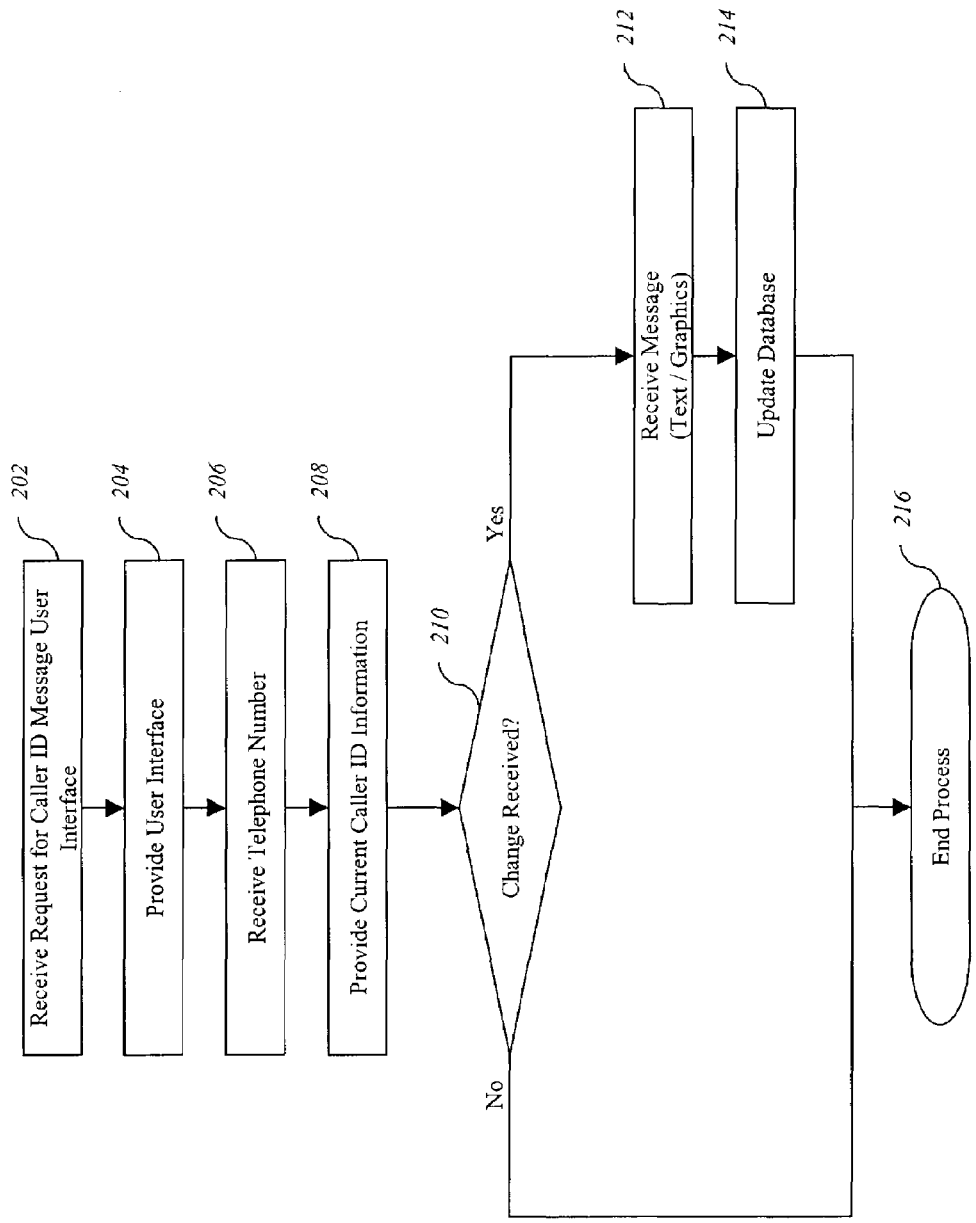
FIG. 2 is a flowchart, illustrating the process of associating advertising information with a telephone number in one embodiment of the present invention.

In an embodiment of the current invention, a subscriber associates a message, such as an advertisement, with Caller-ID information, and then when the subscriber subsequently places a call, the message is displayed on a Caller-ID display. FIG. 2 is a flowchart, illustrating the process of associating advertising information with a telephone number in one embodiment of the present invention. A service provider may utilize various methods for allowing a subscriber to maintain the advertising information. For example, in one embodiment, the SMS (114) includes web server software, executing a web-enabled user interface. A subscriber uses computer (116) to execute web browser software, such as Microsoft's Internet Explorer or Netscape's Navigator. The subscriber provides the uniform resource locator (URL) for the Caller-ID maintenance site, either by typing in the URL or by navigating via a hyperlink. When the SMS (114) receives the hypertext transfer protocol (HTTP) request for the URL associated with the Caller-ID advertisement application 202, the SMS (114) provides a hypertext markup language (HTML) page that includes the user interface for Caller-ID maintenance 204. In another embodiment, the service provider utilizes a telephone-enabled user interface, which accepts dual-tone multi-frequency signals to create the message.

The user interface may include various elements, including an element for selecting or entering a telephone number. The subscriber enters a telephone number and clicks a button or other element to submit the page. The SMS (114) receives the telephone number 206. In response, the SMS (114) provides current Caller-ID information by searching the database (112) for information associated with the telephone number 208. The subscriber may or may not request a change to the information. If the subscriber makes a change and submits the change to the SMS (114), the SMS (114) receives the change 210. The subscriber provides the text for the message along with the change request. The SMS then updates the database (112) associated with the SCP (110) 212. The update may occur immediately or may occur during a periodic batch process, such as a nightly batch process. In another embodiment, the message is stored separately from the Caller-ID information and substituted for the Caller-ID information when the call terminates. In such an embodiment, the Caller-ID functioning on the SCP (110) is modified to perform the proper logic.

For example, one subscriber is a chain restaurant. The restaurant sells pizzas and offers two pizzas for the price of one on Friday evenings. On Friday afternoon, the manager of the restaurant enters the service provider's web site and inputs the message, "Ask about 2-4-1." Subsequently, the manager calls customers of the restaurant to confirm their reservations. The message "Ask about 2-4-1" appears in the customer's Caller-ID display.

When using a conventional Caller-ID display, the message will typically comprise only text. However, many conventional phones are now capable of displaying graphics, particularly the current generation of wireless phones. An embodiment of the present invention may present text, graphics, or other multimedia file types, depending on the capabilities of the subscriber equipment and of the implementation of the AIN components in the telecommunications network. For example, many conventional databases, such as Microsoft's SQL Server and Oracle's Oracle 9i, have the capability of storing both text and multimedia objects. However, a conventional Caller-ID service may lack the bandwidth necessary to transmit a multimedia file between the first and second rings. In an embodiment utilizing an IP infrastructure, such limitations are not present. Referring again to FIG. 2, once the message has been received, the process ends 216.

Figure 3:
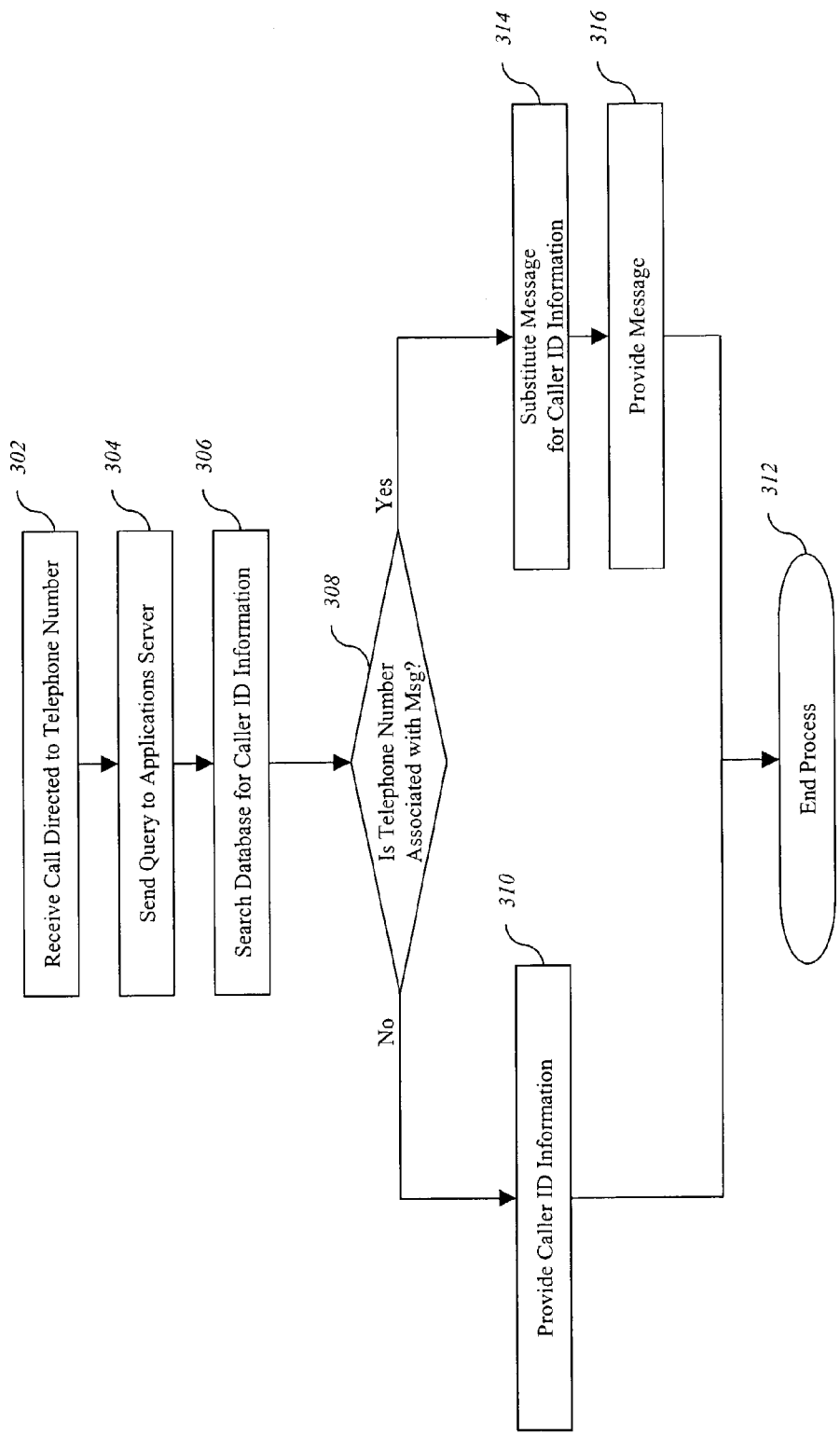
FIG. 3 is a flow chart, illustrating a process of providing the advertising information.

FIG. 3 is a flowchart, illustrating a process of substituting the advertisement for Caller-ID information in one embodiment of the present invention. In the process shown, a subscriber places a call to a telephone number with phone (104). The SSP (106) serving telephone (104) receives the call 312. In response, the SSP (104) executes a trigger and submits a query to the SCP (110), which serves as an applications server for the Caller-ID application.

The SCP (110) queries the database (112) for Caller-ID information associated with the telephone number called 308. The SCP then determines whether the telephone number is associated with a message, such as an advertisement 306. If not, the SCP provides the Caller-ID information 310 and the process ends 312. If the telephone number is associated with a message, the SCP (110) substitutes the message for the Caller-ID information 314 and provides the message to the telephone (102) 316. The process then ends 312.

Although the description of the embodiment of a process shown in FIG. 3 describes the substitution of an advertisement for Caller-ID information, a subscriber may choose to substitute any information for the Caller-ID information. For example, the subscriber may wish to substitute a nickname. Alternatively, the subscriber may wish to commemorate an important event and substitute text, such as "Proud New Parents" for the Caller-ID information provided in conventional Caller-ID systems. Additionally, as new technologies provide the capability for substituting multimedia files for conventional Caller-ID information, the subscriber may choose to substitute pictures and sound for conventional Caller-ID information. Also, in another embodiment, the message is presented with the Caller-ID information and not substituted for the Caller-ID information.

One embodiment of the present invention includes a computer-readable medium, having computer-readable instructions for providing a message in Caller-ID information. The computer-readable medium may also include program code for displaying and/or entering the message. When the message is transmitted, it comprises a computer data signal embodied in a digital data stream. A computer-readable medium includes an electronic, optical, magnetic, or other storage or transmission device capable of providing a processor, such as the processor in a web server, with computer-readable instructions. Examples of such media include, but are not limited to, a floppy disk, CD-ROM, magnetic disk, memory chip, or any other medium from which a computer processor can read. Also, various other forms of computer-readable media may transmit or carry instructions to a computer, including a router, private or public network, or other transmission device or channel.

Embodiments of the present invention provide various revenue sources for service providers. In one embodiment, the subscriber pays a fixed monthly charge to change the Caller-ID information at any time. In another embodiment, the subscriber pays a fixed monthly charge to change the Caller-ID information a fixed number of times per month, for example, three times. In such an embodiment, the subscriber pays additional charges for making more than three changes. In yet another embodiment, a subscriber receives a discounted service for accepting the substitution of modified Caller-ID information.

The foregoing description of the preferred embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the present invention.

The invention claimed is:

1. A method for providing a message to a telephone user, comprising:
   receiving a message for use in modifying calling number identification information;
   updating a database using a service management system (SMS), wherein updating the database occurs during a prescribed update schedule;
   associating the message with a telephone number of a calling party;
   after associating the message with the telephone number of the calling party, receiving a request at an application server for calling number identification information associated with the telephone number of the calling party;
   querying the database for the calling number identification information;
   substituting the message associated with the telephone number of the calling party for the calling number identification information at the application server during a periodic batch process using an Internet Protocol (IP) infrastructure; and
   after substituting the message for the calling number identification information, providing the message in response to the request to a receiving device and charging the calling party for substituting the message for the calling number identification information.

2. The method of claim 1, wherein the message comprises an advertisement.

3. The method of claim 1, further comprising displaying the message.

4. The method of claim 1, wherein associating the message with the telephone number of the calling party comprises receiving the message in a user interface.

5. The method of claim 4, wherein the user interface comprises a web-enabled user interface.

6. The method of claim 4, wherein the user interface comprises a telephone-enabled user interface.

7. The method of claim 1, wherein the application server comprises a service control point.

8. A computer-readable medium on which is encoded computer program code for providing a message to a telephone user comprising:
   program code for associating a message with a telephone number of a calling party;
   program code for receiving a request at an application server for calling number identification information associated with the telephone number of the calling party, after the message is associated with the telephone number of the calling party;
   program code for querying a database for the calling number identification information;
   program code for substituting the message associated with the telephone number of the calling party for the calling number identification information at the application server during a periodic batch process using an Internet Protocol (IP) infrastructure;
   program code for providing the message in response to the request to a receiving device after substituting the message for the calling number identification information; and
   program code for charging the calling party for substituting the message for the calling number identification information.

9. The computer-readable medium of claim 8, wherein the message comprises an advertisement.

10. The computer-readable medium of claim 8, further comprising program code for displaying the message.

11. The computer-readable medium of claim 8, wherein the program code for associating the message with the telephone number of the calling party comprises program code for receiving the message in a user interface.

12. The computer-readable medium of claim 8, wherein the application server comprises a service control point.

13. A system for providing a message to a telephone user using a telecommunications network, comprising:
   a calling number identification database in communication with the telecommunications network operative to associate a message with a telephone number of a calling party, wherein the calling number identification database receives message updates according to a prescribed updating schedule; and
   an application server in communication with the calling number identification database operative to:
      receive a request for calling number identification information associated with the telephone number of the calling party, after the message is associated with the telephone number of the calling party;
      query the calling number identification database for the calling number identification information;
      substitute the message associated with the telephone number of the calling party for the calling number identification information during a periodic batch process using an Internet Protocol (IP) infrastructure; and
      provide the message in response to the request for the calling number identification data to a receiving device after substituting the message for the calling number identification information.

14. The system of claim 13, wherein the calling number identification database comprises a message data store.

15. The system of claim 14, wherein the message data store comprises a message attribute.

16. The system of claim 13, further comprising a calling number identification display device in communication with the telecommunications network.

17. The system of claim 16, wherein the calling number identification display device comprises a telephone.

18. The system of claim 17, further comprising:
   a web server in communication with the calling number identification database; and
   a user interface executing on the web server.

19. A method for providing a message to a telephone user, comprising:
   associating a message with a telephone number of a calling party when the calling party has not invoked a privacy option;
   after associating the message with the telephone number of the calling party, receiving a call from the telephone number of the calling party;
   receiving a request at an application server for calling number identification information associated with the telephone number of the calling party;

querying a database for the calling number identification information;

determining if the telephone number of the calling party is associated with the message;

if the telephone number of the calling party is associated with the message, then substituting the message associated with the telephone number of the calling party for the calling number identification information at the application server during a periodic batch process using an Internet Protocol (IP) infrastructure; and after substituting the message for the calling number identification information, providing the message in response to the request for the calling party identification information to a receiving device and charging the calling party for substituting the message for the calling number identification information.

* * * * *